June 28, 1932. F. POLLITZER ET AL 1,865,135
APPARATUS FOR THE SEPARATION OF GAS MIXTURES
Original Filed May 24, 1929
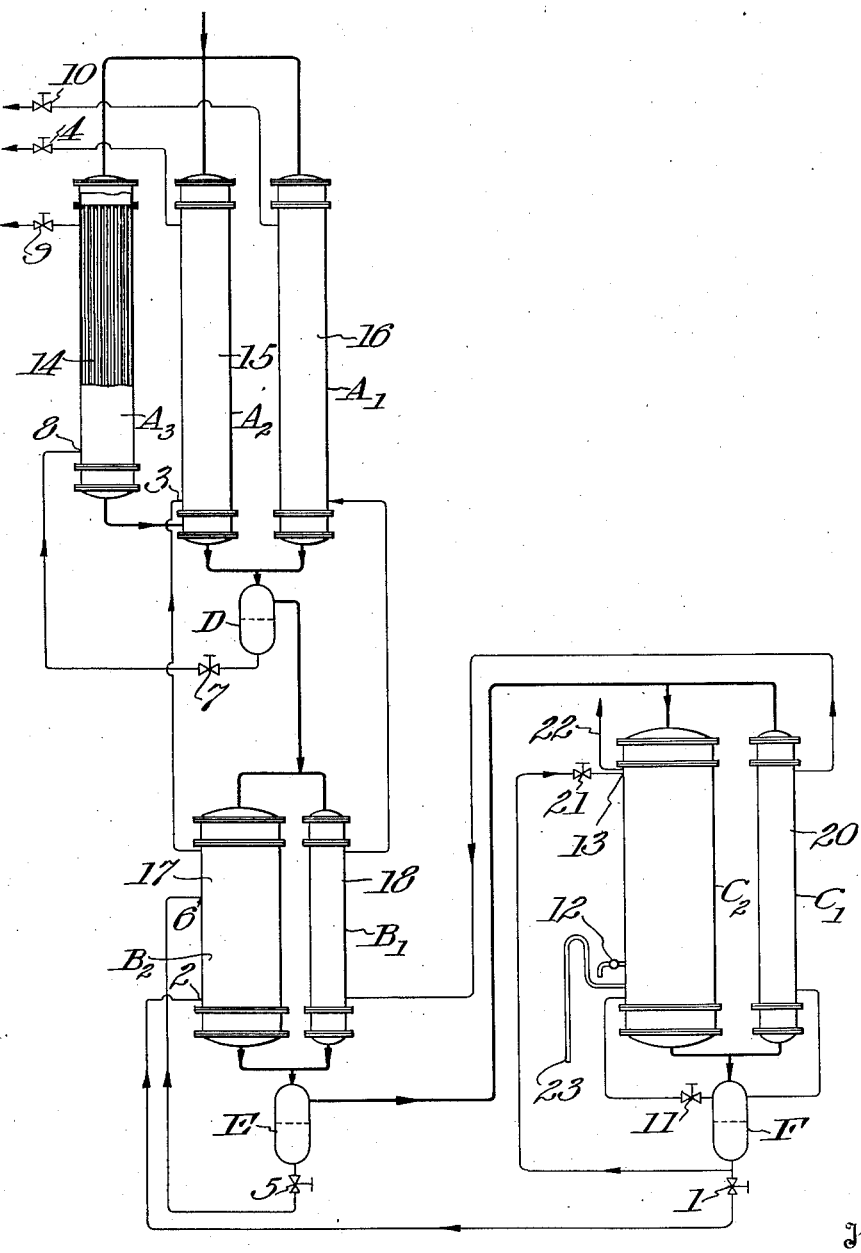
Inventors:
Franz Pollitzer
Heinrich Kahle
By Byrnes, Townsend & Potter
Attorneys.

Patented June 28, 1932

1,865,135

UNITED STATES PATENT OFFICE

FRANZ POLLITZER, OF GROSSHESSELOHE, NEAR MUNICH, AND HEINRICH KAHLE, OF HOLLRIEGELSKREUTH, NEAR MUNICH, GERMANY

APPARATUS FOR THE SEPARATION OF GAS MIXTURES

Original application filed May 24, 1929, Serial No. 365,742. Divided and this application filed March 20, 1931. Serial No. 524,128.

The present invention relates to apparatus for the separation of gas mixtures.

In the separation of gas mixtures by cooling and partial condensation, it is well known to be necessary, in the interest of cold economy, to transfer the cold produced by the vaporization of the liquefied portion as far as possible to new gas to be separated and to utilize it for the condensation of further portions of this gas. For this purpose different vaporization vessels are provided for the different condensates, in which the condensate separated in a given temperature range collects after releasing the pressure and is vaporized by heat exchange with the compressed fresh gas passed through the container. Since in most cases the condensation of the components takes place in large part at lower partial pressures, and therefore at very much lower temperatures than is the case in the subsequent revaporization at atmospheric pressure, a complete utilization of the heat of vaporization in this manner is not possible. In the vaporization of mixtures the further disadvantage arises that the more highly boiling components accumulate in the vaporization vessel whereby a still further increase in the boiling temperature, unfavorable for the utilization of cold, occurs. Moreover, the provision of the different vaporization vessels is a complicated and expensive method of construction.

It is indeed already known that in the separation of simple gas mixtures (for example, water gas) the vaporization vessel may be directly connected with the counter-current heat exchanger. In this case the vaporization takes place at practically constant temperature and is localized at the lower end of the counter-current heat exchanger, since the boiling point ranges of the condensates separated from the water gas lie very close to one another. This method is ineffective in every case in which the components of the gas mixture to be separated are of widely separated boiling points, as is the case with the coke oven gas.

The disadvantages described are avoided by the method of operation of the present invention. The essential elements are as follows:

The liquid mixture serving as a cooling means for the fresh gas is expanded directly in a counter-current heat exchanger and vaporized in counter-current heat exhange with the fresh gas. The vapors remain in contact with the unvaporized portions of the liquid. Since the higher boiling components accumulate in the liquid portion, the last part of the liquid boils at a much higher temperature than the first part. The vaporization therefore extends over a wide interval; the mixture of liquid and vapor is carried in mass to the warmer parts of the heat exchanger, as warming becomes necessary for vaporization.

The vapors above the liquid form a diluent which lowers the partial pressure of the vapors continually produced and thereby also lowers the vaporization temperature.

This method of operation makes it possible to utilize the cold contained in the liquid products in a particularly favorable manner at lower temperatures, which results in a notable saving in cold requirements in contrast to other processes. Special means for the transfer of the cold, as described for example in German Patent 469,446, therefore may become dispensable.

A particularly advantageous method of carrying out the process consists in passing the liquid portion together with the accompanying gaseous portion, up through a counter-current heat exchanger consisting of a vertical sheaf of tubes, the current velocity being made so large, by suitable reduction of cross-section, that the liquid portion is carried along by the gaseous portion and brought into the region of higher temperature. The same principle can naturally also be applied with heat exchangers in which the current is not vertical but inclined upwardly, for example in spirals.

If several condensates, separated at different temperatures, are to be vaporized for the cooling of the gas mixture, the vaporization of all of the condensates can take place in the same heat exchanger. They are introduced at different places in the heat exchanger, particularly at such places as are at a temperature as nearly as possible that of their boiling points. The vaporization of the lower boiling components can in general be completed at the point where the fraction which contains mainly higher boiling components is introduced. The mixing of fractions of different temperatures, which is uneconomical of cold and might lead to the separation of solid materials, is avoided.

If it is desired to obtain the different fractions separately, the gas to be cooled is lead through several parallel heat exchangers and in each of these heat exchangers is contacted with one or more of the separated fractions in order to vaporize them by means of the fresh gas. The above described lowering of the partial pressure of vaporization of the last portion of the liquid to be vaporized occurs in this case also, since in general the fractions are not pure substances, but mixtures of substances of different boiling points.

As cooling means, condensates from the gas to be cooled, as well as other suitable cooling liquids, can be vaporized according to the process of the invention.

The operation of the process as applied to coke oven gas will be described with reference to the accompanying figure which shows for purposes of illustration, a diagrammatic sketch of one embodiment of the invention.

In the figure, $A_1$, $A_2$, and $A_3$, $B_1$ and $B_2$, $C_1$ and $C_2$ are counter-current heat exchangers, D, E and F are separators, 1, 4, 5, 7, 9, 10 and 11 are valves. The counter-current heat exchangers comprise nests of tubes as shown more particularly at 14 in heat exchanger $A_3$, the tubes opening into headers at the top and bottom of the heat exchangers. Previously purified coke oven gas is introduced into the three parallel heat exchangers $A_1$, $A_2$ and $A_3$ under pressure and passes through these by way of the nests of tubes contained therein. The condensate (ethylene contaminated with methane), which is separated by the cooling in these three branches, is collected in separator D. The uncondensed gas is introduced into the two tube nests in heat exchangers $B_1$ and $B_2$ and is subjected here to a further cooling leading to a further condensate, principally methane with a small amount of carbon monoxide which is separated from the residual gas in separator E. The last stage of the cooling is completed in two tube sheafs which are in the heat exchangers $C_1$ and $C_2$. In the separator F the condensate hereby formed, consisting of nitrogen and carbon monoxide, is separated, while the main amount of the uncondensed gas, which consists of almost pure hydrogen, leaves the apparatus through the counter-current heat exchangers $C_1$, $B_1$ and $A_1$.

The return of the condensates separated in D, E and F, takes place as follows:

The condensate coming from F, consisting in the main of $N_2$, CO, and a little $CH_4$, is forced through the valve 1 and enters the lower part of the heat exchanger $B_2$ at 2. There it quickly becomes so warm that the nitrogen vapors formed from the liquid, together with a small amount of hydrogen vapor which accompanied the liquid coming out of valve 1, elevate the still unvaporized portion of the liquid in $B_2$. In this way the liquid is brought into the warmer zones and even the higher boiling components, such as carbon monoxide, are for the most part vaporized by the time the liquid residue reaches the second inlet of the heat exchanger at 6.

At this point the condensate (mainly methane and carbon monoxide) coming from the separator E is introduced into the heat exchanger $B_2$. The carbon monoxide-rich vapors arising from this liquid intermingle with the nitrogen and carbon monoxide coming from below. The vapor mixture carries the methane-rich liquid residue up into the upper part of $B_2$ and creates a carbon monoxide and nitrogen-rich atmosphere into which the liquid methane liberates its vapor.

The methane-partial pressure in the vapor thus always remains less than one atmosphere. The cold of the revaporization of the methane is therefore available at such a low temperature that the methane is condensed out of the fresh gas in the tube nest in B down to a small partial pressure. The almost completely vaporized condensate is conducted through heat exchanger $A_2$ by way of 3 and 4 for complete warming up. In a corresponding way the condensate from separator D is vaporized and warmed up in $A_3$ by way of 8 and 9. Instead of three separate heat exchangers $A_1$, $A_2$ and $A_3$, the three tube nests could naturally be combined as one tube sheaf and brought into a single shell, only the space surrounding the tube nest would have to be divided into three compartments for the separate flow of the hydrogen and of the condensates coming from D, and from E and F.

For the lowest cooling, liquid nitrogen is provided in heat exchanger $C_2$. In accordance with the invention a small amount of hydrogen can be expanded through valve 11 and mixed with the liquid nitrogen introduced at 12, for the purpose of lowering the partial pressure. The greater the amount of this gas, the lower will the temperature be at 12. By suitable adjustment of the cross-section of the heat exchanger $C_2$, the liquid nitrogen will be carried upward by the hydrogen. With increasing temperature further amounts of nitrogen are thus vaporized.

In contradistinction from the known processes which lower the vaporization temperature of a cooling liquid in a cooling bath by means of a non-condensible gas, for example hydrogen, the process herein described offers many advantages: first, the necessary amount of hydrogen is much lower, since the nitrogen content of the mixture leaving at 22 is very high corresponding to the high temperature at this point. The further circumstance that only a part of the nitrogen is vaporized at the lowest temperatures effects a saving of liquid nitrogen, since the cold losses rapidly increase with decreasing temperature.

In many cases it is advantageous to vary the arrangement from that described above, so that the liquids are not carried along by the gaseous portions in the heat exchangers, but trickle down in counter-current to the gaseous portions, while the fresh gas to be cooled passes through in the same direction with the liquid. In this method of operation of the process, therefore, the liquids are passed from regions of higher temperature to regions of lower temperature, while the gas is introduced at the point of lowest temperature. While the amount of cooling liquid introduced is varied according to the cold requirements of the fresh gas, the temperatures throughout the heat exchanger are fixed by the relation of the amount of vaporized liquid to the amount of the auxiliary gases picking up the vapor. In this method of operation the vaporization of a simple liquid, such as nitrogen, occurs just as with a mixed liquid, not at constant temperature, but extended over a temperature interval which extends from the temperature of the liquid at the top of the heat exchanger to the temperature of the lower end of the heat exchanger. Since because of the presence of the auxiliary gas the vaporization of the cooling liquid takes place at low partial pressures, here also the cold of vaporization is utilized at very low temperatures for the separation of condensates from the fresh gas, so that under certain circumstances the process does away with the use of a vacuum pump.

The practical operation of the process just described is effected by introducing a part or the whole of the liquid condensate separated in F into the upper end of $C_2$ at 13 through valve 21, while a stream of hydrogen is introduced counter-current thereto from 11. Any possible excess of liquid is removed through siphon 23. In this method of operation the valve 12 remains closed. Advantageously the condensate is pre-warmed to the temperature at 13 by taking up heat from the fresh gases. The descending condensate is vaporized into the ascending hydrogen stream, which can take up continually more of the vapors the higher its temperature becomes in rising, and which finally leaves the heat exchanger at 22 saturated with the vapor of the condensate. Instead of drawing condensate out of F for the cooling, naturally here also liquid nitrogen coming from a special liquefaction process can be used. The practical advantages arising from this method of operation are the same as described above: decrease in the requirement of auxiliary gas and of cold. The amount of auxiliary gas need only be so much that on the one hand in rising through the heat exchanger it can take up all of the vapors formed from the cooling liquid by absorption of heat from the fresh gas; on the other hand, that at the lowest temperature the partial pressure of the vaporized cooling liquid in the auxiliary gas must correspond to the vapor pressure of the cooling liquid at the same temperature. The two methods of operation described—downward flow of the liquid counter-current to the auxiliary gas, or upward flow of the liquid together with the auxiliary gas—make possible operation with considerably lower amounts of auxiliary gas than when the auxiliary gas is passed through a stationary bath of cooling liquid.

This application is a division of our application Ser. No. 365,742, filed May 24, 1929.

We claim:

1. Apparatus for separating the constituents of gas mixtures by condensation at low temperatures comprising a plurality of counter-current heat exchangers serially connected through gas and liquid separating devices, means for passing the gas from each of said separating devices to the next serially succeeding heat exchanger, means for returning the liquid from each of said separating devices to at least one preceding heat exchanger, and means for returning the gas from the last of said separating devices to at least one preceding heat exchanger.

2. Apparatus for separating the constituents of gas mixtures by condensation at low temperatures comprising a plurality of counter-current heat exchangers serially connected through gas and liquid separating devices, means for passing the gas from each of said separating devices to the next serially succeeding heat exchanger, means for returning the liquid from each of said separating devices to at least one preceding heat exchanger, and means for returning the gas from the last of said separating devices to at least one preceding heat exchanger, at least one of said heat interchangers comprising a plurality of parallel connected heat interchanger units.

3. Apparatus for separating the constituents of gas mixtures by condensation at low temperatures comprising a plurality of counter-current heat exchangers serially connected through gas and liquid separating devices, means for passing the gas from each of said separating devices to the next serially succeeding heat exchanges, and means for returning the liquid from each of said separating devices together with gas from the last of said separating devices to a preceding heat exchanger.

4. Apparatus for separating the constituents of gas mixtures by condensation at low temperatures comprising a plurality of counter-current heat exchangers consisting of a vessel containing a vertical sheaf of tubes serially connected through gas and liquid separating devices, means for passing the gas from each of said separating devices to the next serially succeeding heat exchanger, and means for returning the liquid from each of said separating devices together with gas from the last of said separating devices to a preceding heat exchanger.

5. Apparatus for separating the constituents of gas mixtures by condensation at low temperatures comprising a plurality of counter-current heat exchangers consisting of a vessel containing a vertical sheaf of tubes serially connected through gas and liquid separating devices, means for passing the gas from each of said separating devices to the next serially succeeding heat exchanger, and means for returning the liquid from each of said separating devices together with gas from the last of said separating devices to a preceding heat exchanger, the cross-sectional area of the tubes relative to that of the vessel being such that the liquid portion is carried upward through the heat exchanger by the velocity of the gaseous portion.

In testimony whereof, we affix our signatures.

FRANZ POLLITZER.
HEINRICH KAHLE.